(12) United States Patent
Lynn et al.

(10) Patent No.: US 7,796,024 B2
(45) Date of Patent: Sep. 14, 2010

(54) AUTOMATED MULTI-PURPOSE ALERT SYSTEM WITH SENSORY INTERRUPTS

(75) Inventors: David Lynn, Boca, FL (US); Barry Lynn, Hollywood, FL (US)

(73) Assignee: DB Systems, LLC, Hollywood, FL (US)

( * ) Notice: Subject to any disclaimer, the term of this patent is extended or adjusted under 35 U.S.C. 154(b) by 230 days.

(21) Appl. No.: 12/025,840

(22) Filed: Feb. 5, 2008

(65) Prior Publication Data

US 2008/0186199 A1    Aug. 7, 2008

Related U.S. Application Data

(60) Provisional application No. 60/888,689, filed on Feb. 7, 2007.

(51) Int. Cl.
G08B 29/00 (2006.01)
(52) U.S. Cl. .............. 340/506; 340/825.37; 379/102.03
(58) Field of Classification Search ................. 340/506, 340/825.37; 379/102.03
See application file for complete search history.

(56) References Cited

U.S. PATENT DOCUMENTS

| 4,243,973 A | 1/1981 | Sandidge |
|---|---|---|
| 4,370,675 A * | 1/1983 | Cohn .......................... 348/156 |
| 4,764,953 A | 8/1988 | Chern et al. |
| 5,251,253 A * | 10/1993 | Chutuk .................. 379/102.03 |
| 5,528,673 A * | 6/1996 | Rosenthal .............. 379/102.03 |
| 5,870,453 A | 2/1999 | Shapiro |
| 6,703,930 B2 | 3/2004 | Skinner |

FOREIGN PATENT DOCUMENTS

| GB | 2285353 | 7/1995 |
|---|---|---|
| JP | 60042941 | 3/1985 |
| WO | WO 86/03353 | 6/1986 |

* cited by examiner

Primary Examiner—Travis R Hunnings
(74) Attorney, Agent, or Firm—David W. Barman; Robert M. Schwartz

(57) ABSTRACT

The present invention is an alert system and apparatus that interrupts the operation of sound producing and video display entertainment and communication devices and replaces the signals with an audible verbal annunciation and text message that overlays on the video displayed and initiates an alerting device or devices in connection with attracting the attention of hearing and/or visually impaired persons, persons who are not in close proximity to the area relating to the alert or by person who desire to be alerted by these mechanism.

8 Claims, 6 Drawing Sheets

PREFERRED EMBODIMENT

An Integrated Programmable Controller with Bluetooth audio / on-screen video display capability that accepts both hardwired and wireless RF triggers that result in interrupts of audio and video signals then displaying the cause of the interrupt in on-screen video and amplified audio at a remote location for the primary purpose of assisting a hearing or visually impaired individual or just someone who wants to view television without disturbing anyone around them.

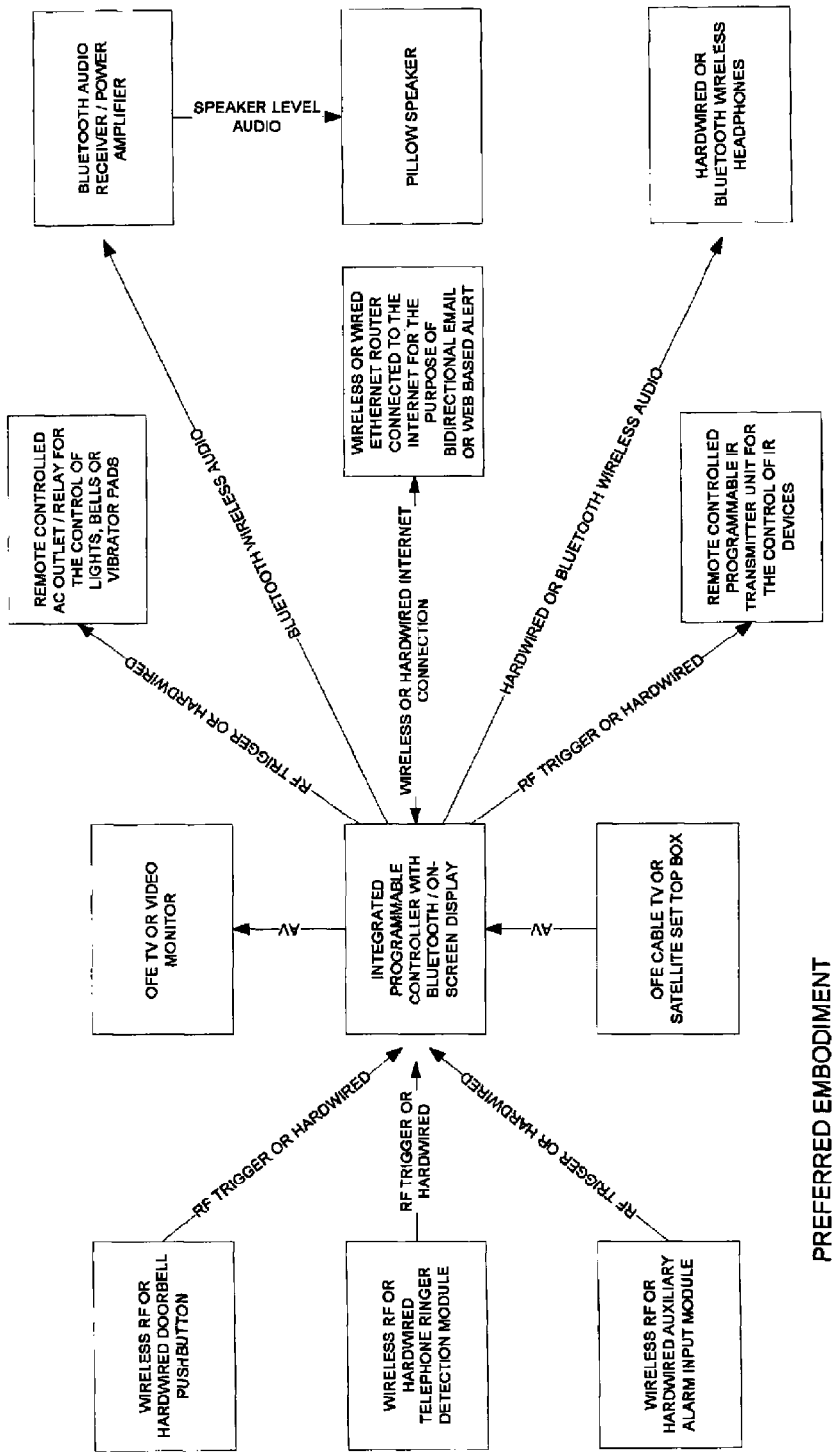

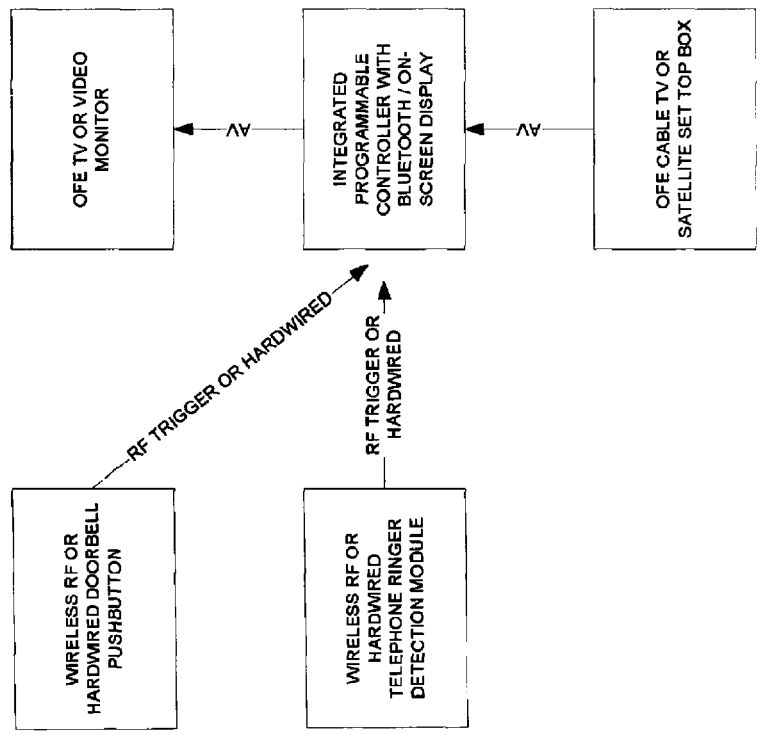

FIGURE 2

DOORBELL – TELEPHONE ANNOUNCEMENT EMBODIMENT

Interrupting of audio and video signals when either doorbell is sounded or the telephone rings, then displaying the cause of the interruption on-screen video and amplified audio at a remote location for the primary purpose of assisting a hearing or visually impaired individual or just someone who wants to view television without disturbing anyone around them.

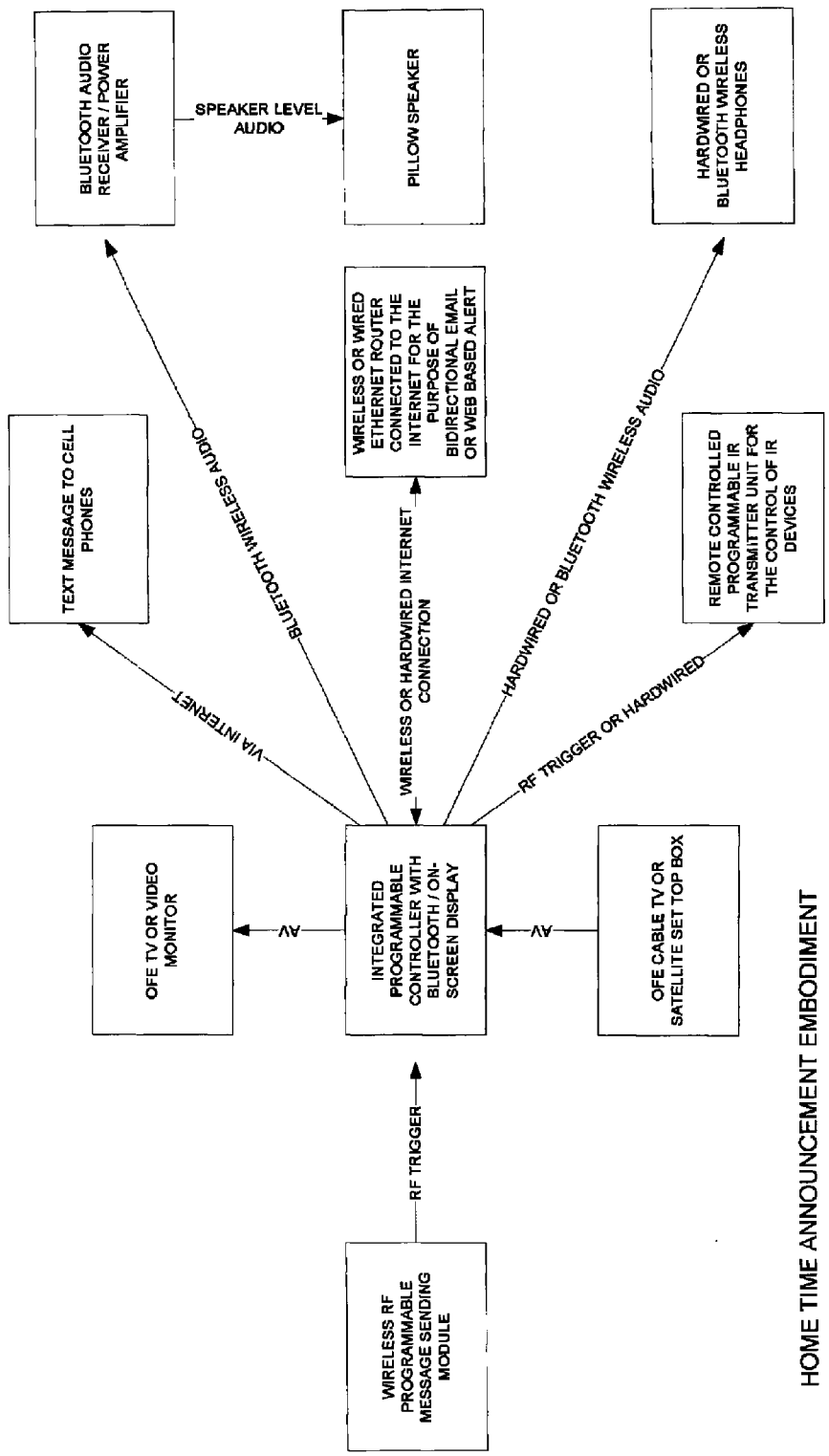

FIGURE 3

HOME TIME ANNOUNCEMENT EMBODIMENT

An Integrated Programmable Controller with Bluetooth audio / on-screen video display capability that accepts wireless RF triggers that result in interrupts of audio and video signals then displaying the pre-programmed message of the interrupt in on-screen video and amplified audio at a remote location including but not limited to television, computer and cell phones for the primary purpose of assisting a hearing or visually impaired individual or just someone who wants to view television without disturbing anyone around them.

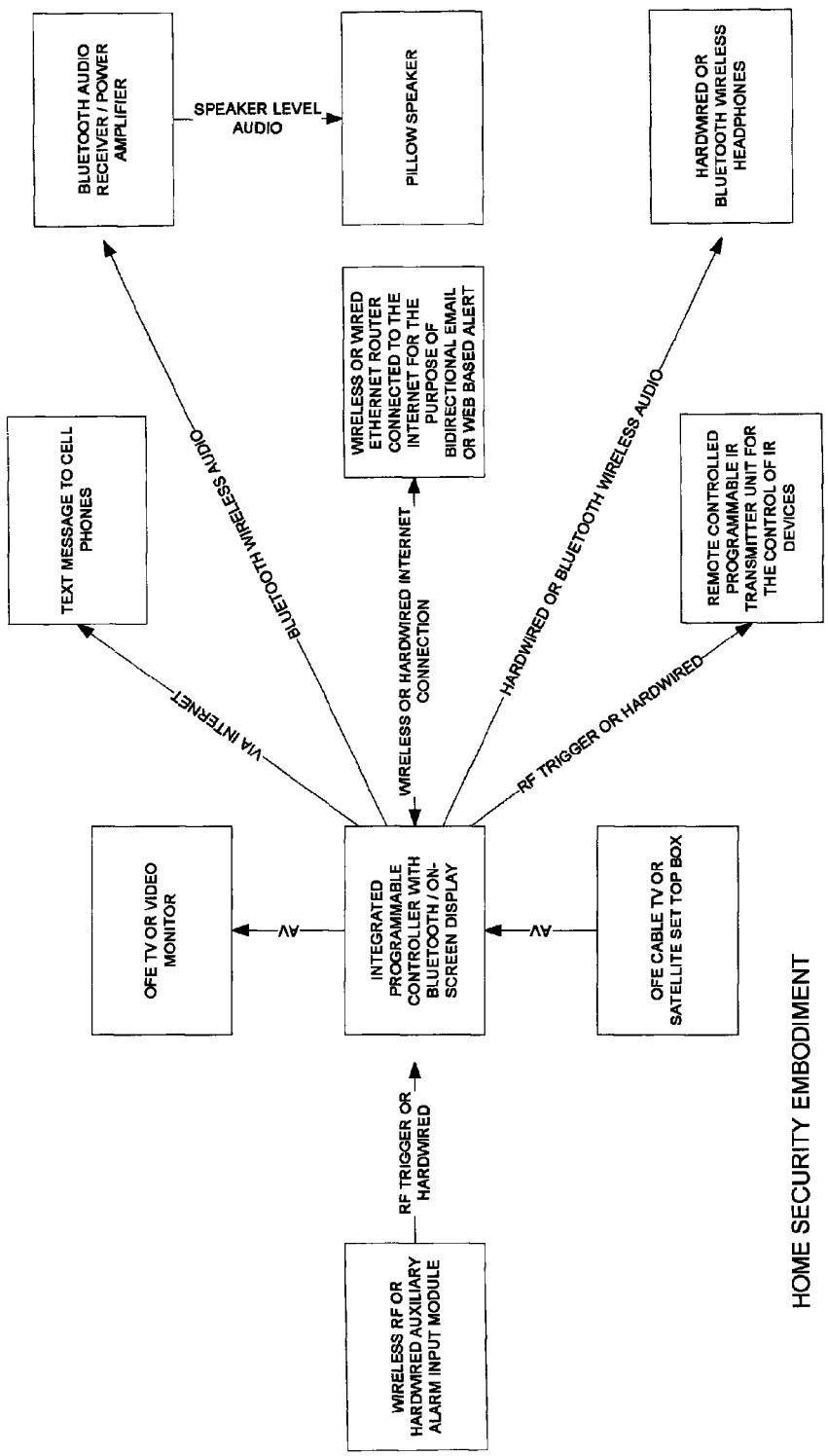

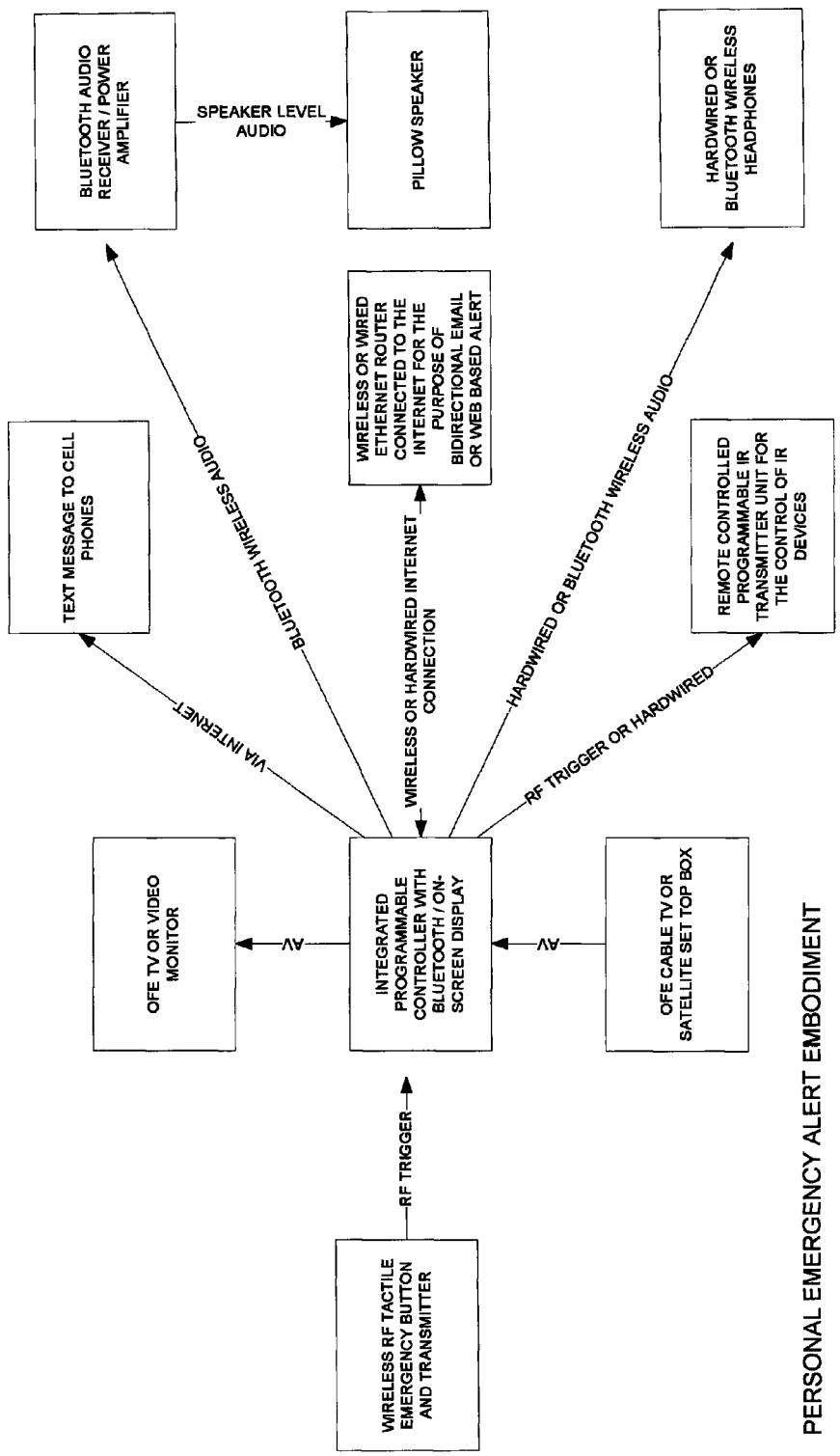

COMMUNICATIONS EMBODIMENT

Designed for the person with hearing or visual impairments or that person wishing to have all communications, telephone, text messages and emails viewed on local television. The system also has the capability of two way communication via the Bluetooth Bi-directional Pillow.

AUTOMATED MULTI-PURPOSE ALERT SYSTEM WITH SENSORY INTERRUPTS

INDEX TO RELATED APPLICATIONS

This application claims benefit of U.S. Provisional Patent Application Ser. No. 60/888,689 filed Feb. 7, 2007 the disclosure of which is incorporated herein by reference in its entirety.

BACKGROUND OF THE INVENTION

1. Field of the Invention

The present invention relates to alerting devices and systems and more particularly to a novel electronic aid for attracting the attention of but not limited to hearing and/or visually impaired persons, permitting interruption of operation of external sound producing entertainment and video display devices including but not limited to stereos, TVs, video monitors, cell phones, pagers, vehicular navigation systems, communication devices, informational displays, personal computers, pocket pc, digital audio/video servers, as well as initiating operation of visual, motion and aural alerts, wherein such interruption and initiation of circuit operations is actuated by various external input devices.

2. Brief Description of the Field of the Invention

It has been the conventional practice for residents and occupants of a dwelling, vehicle or standing alone to enjoy a variety of sound producing and visual display entertainment and informational devices such as television, stereo, radios, computers and the like, which involves listening to such devices at a raised audio level or where the person is totally deaf, their entertainment medium is of a visual nature. Usually, the level is such that the residents or occupants with normal hearing enjoying the entertainment will still detect or sense overriding sounds such as the ringing of the telephone or a doorbell. However, problems and difficulties are encountered when persons have impaired hearing or sight such that during the enjoyment of the entertainment, such persons are at a high risk of missing incoming telephone calls, life-safety alarms which may include, but would not limited to Fire, Smoke or Burglary, visitors ringing the doorbell or other interrupting situations. The primary intent of this invention is to assist people with hearing or visual impairments; however this invention can be helpful for anyone who desires to utilize these technologies and feature sets within their lifestyle.

Also, when hearing and/or visually impaired persons or others interested in using the alert system are at a location some distance from the ringing, such as in the backyard, or the entertainment devices are not in operation, they may be unable to hear either the doorbell or the telephone should one be actuated. Such persons are severely restricted in their enjoyment of such entertainment and outdoor activities, as well as indoors if the entertainment device is not in operation.

In the case of TV satellite receivers, existing systems have displayed a name and telephone number as an on-screen caller ID feature. The present invention displays specific on-screen messages informing the viewer of an initiating event. For example, when a telephone is ringing the system simultaneously replaces the audio content with an audible message not limited to "Your phone is ringing", or "Your doorbell is ringing" or other messages appropriate to the input actuator of the sequence. Therefore, a long standing need has existed to provide a system and apparatus for interrupting the audio output and replacing the audio with an audible announcement of the alerting event from such entertainment devices when a telephone or a doorbell rings. In the case when a television is being viewed, not only is the audio interrupted and replaced, an on-screen video text message is provided. In addition to the alert message being displayed on the TV screen for an incoming call, the alerting device will display the Caller ID where available. The user has the option to select "large thick font in high contrast text" for the purpose of assisting the visually impaired person. In the case where no entertainment system is involved, the system needed should include a mechanism for operating an alert device such as a bell, light or email or text message alert to a cell phone when the entertainment device may not be in operation or the person is at a location some distance from the doorbell or telephone ringing. In this manner, the hearing and/or visually impaired person will be alerted to the fact that an attempt is being made to contact the person. The device also archives the alert information for retrieval at a later time, in the event that the person had not seen or heard the alert when it actually occurred.

SUMMARY OF THE INVENTION

Accordingly, the above problems and difficulties are obviated by the present invention which provides a novel electronic mechanism for interrupting the operation of sound and/or visual entertainment devices and for initiating external alert devices so as to attract the attention of hearing and/or visually impaired persons when external input actuator mechanism are operated. In one form of the invention, the external input actuator mechanism includes input circuits comprising a variety of actuators such as a doorbell, a telephone, an alarm system and an auxiliary operated hand switch, etc., that temporarily control the continuing operation of external output alert devices taking the form of radios, television, stereos and other audio producing and video display electronic devices. Additional circuit mechanisms are provided for initiating external aural and visual signals in response to the operation of all external input actuators. In one form of the invention, output actuator mechanism are provided which are operably connected to the attention attracting mechanism via internal interruption circuits wherein the interruption circuits comprise interconnection of an input processing mechanism for external actuator signals, an integrated programmable controller, and an output actuator mechanism for interconnection of external attention attracting mechanism, and time delay mechanism so that a pre-determined time delay permits a limited discontinuation and replacement of audio operation with an audible announcement of the alert. Simultaneously the video is interrupted on a TV or other visual display device and the alert message is displayed in text. The alerts can occur on a variety of selected attention attracting devices such as but not limited to email notification, text messaging, flashing lights, vibration pads, etc. The invention contemplates that an external actuator identification will alert a user as to where the actuation signal originates such as the "doorbell", "alarm", "phone", "email message" and the like. The invention further contemplates a closed loop power latching arrangement, whereby electrical circuits may be interrupted when the system is activated.

In one embodiment, the present invention is an alert system for hearing and/or visually impaired persons that provides audio muting, audible alert annunciation and video text overlay on and of external and remote competing sound sources such as TV's, stereos, radios as well as but not limited to the muting of other sound sources generated by electric and electronic devices. The audio signal of and not limited to such devices as TV's, stereos, radios, computers are replaced with an audible annunciation describing the alert condition and where applicable, a video text overlay describing the alert condition as well, the muting being accomplished by an integrated design for processing signal devices such as ringing telephones, doorbells, alarm systems, and auxiliary signal inputs, and actuates external visual and aural alert devices such as but not limited to; a remote audible Bluetooth device, vibrator pad, cell phone, email, remote controlled electrical power switch or lights and bells.

The system has:

(a) a telephone ring and off-hook detector device wherein an alerting signal is sent by an actuator to an input of an integrated programmable controller by either hardwired or wireless transmission;

(b) a receiver for receiving an actuator alerting signal from an external doorbell device, wherein said alerting signal is sent to an input of an integrated programmable controller by either hardwired or wireless transmission;

(c) an external auxiliary device receiving an actuator alerting signal that is sent to an input of an integrated programmable controller by either hardwired or wireless transmission;

(d) a series of programmable variable time delay mechanism independently associated with all input and output signals of said system;

(e) an output switching mechanism connected to said integrated programmable controller;

(f) an audio output switching mechanism connected to said integrated programmable controller;

(f) a video output switching mechanism connected to said integrated programmable controller;

(g) an Ethernet output switching mechanism connected to said integrated programmable controller;

(h) an infrared output switching mechanism connected to said integrated programmable controller;

(i) a closed loop power latching mechanism connected to said integrated programmable controller and to said output switching mechanism;

(j) an integrated programmable controller termination mechanism connected to said integrated programmable controller and said output switching mechanism; and (k) an external actuator identification mechanism connected to said integrated programmable controller with a series of programmable variable time delay mechanism and to said output and isolation mechanism.

The system also has AC voltage detection and calibration mechanism provides detection of an AC ringing voltage from a composite AC and direct current of an external telephone actuator alerting signal and calibration of said AC ringing voltage to a level compatible with the alert system.

The magnetic isolation and impedance matching mechanism provides isolated and non-wired coupling between said external telephone actuator alerting signal and subsequent active processing circuits and matches a 600 ohm impedance of said external telephone actuator alerting signal and a characteristic impedance of said alert system; and the first voltage conversion mechanism provides a unidirectional signal.

Therefore, it is among the primary objectives of the present invention to provide a novel electronic alerting mechanism for gaining the attention of hearing and/or visually impaired persons by controlling external devices such as televisions and radios to have their sound and video interrupted and replaced by an electronic mechanism for a specific time period thereby alerting the hearing and/or visually impaired to the fact that an external input actuating mechanism has been energized.

The present invention is not limited solely to controlling sound producing entertainment devices. Another objective is to provide a novel alerting mechanism for the hearing and/or visually impaired persons which will interrupt other than entertainment devices thus alerting such persons.

Still a further objective of the present invention is to provide the aforementioned novel system that further includes an actuating mechanism for energizing additional forms of visual and aural alert mechanism which are located external to the invention, providing alerts when the entertainment devices are not in operation, or when the hearing and/or visually impaired persons are beyond the audible range of external input actuators.

Yet a further objective of the present invention is to provide a novel electronic mechanism for hearing and/or visually impaired persons that permits such persons to enjoy sound producing entertainment such as radios, televisions or the like, while alerting them to external auxiliary devices which may include, but would not be limited to: incoming phone calls, doorbell ringing, life-safety alarm systems and operation of a hand held switch (Emergency Call Button) located in another room and the like.

In one embodiment, an Emergency Call Button feature would be used in the case of a person experiencing a "personal emergency." That person, utilizing a single tactile button, located on the remote control device of the alerting device or the Bluetooth enabled pillow and shaped as, and with an emergency logo, will engage the system into Emergency Mode by pressing the emergency button for a duration of three seconds or more. This Emergency Mode will mute all audio, make a 911 dial-out and send an emergency signal to a monitoring company. This communication can be, but is not limited to a Cable TV or Security company. The Bluetooth Pillow will then act as a bi-directional speaker phone and allow the person having the "personal emergency condition" to have a conversation with the emergency attendant at the monitoring company. Simultaneously, the alerting device can operate other alert devices such as a bell, light, email alert or a text message via cell phone. The system provides the mechanism to send alerts not limited to family members or caregivers when the system is engaged in the "Emergency Mode."

In one embodiment, the system utilizes existing residential telephone lines. However, the system is not limited to communication via phone lines, and may be by Internet utilizing both wired and wireless technologies, any other communication medium or combinations of communications media.

The Alerting System sends the contact information of the user back to a monitoring company or, in the case of 911, the caller ID is sent. This communication is accomplished by, but not limited to transmissions via LAN, Internet, CO (central office) lines or wireless.

Further, the present invention includes an indicator to announce the external input that is actuating the external output alerting the hearing and/or visually impaired persons. The indicator may be any suitable electronic indicator including, but not limited to an indicator light.

BRIEF DESCRIPTION OF THE DRAWINGS

The features of the present invention, which are novel are set forth with particularity in the appended claims. The present invention, both as to its organization and manner of operation, together with further objects and advantages thereof, may best be undertaken by reference to the following description, taken in connection with the accompanying drawings in which:

FIG. 1 is a block diagram showing one preferred embodiment.

FIG. 2 is a block diagram showing a Doorbell-Telephone Announcement Embodiment.

FIG. 3 is a block diagram demonstrating Home Timer Announcement Embodiment.

FIG. 4 is a block diagram showing a Home Security Embodiment.

FIG. 5 is a block diagram showing a Personal Emergency Alert Embodiment.

DESCRIPTION OF THE PREFERRED EMBODIMENT

Figure 6:
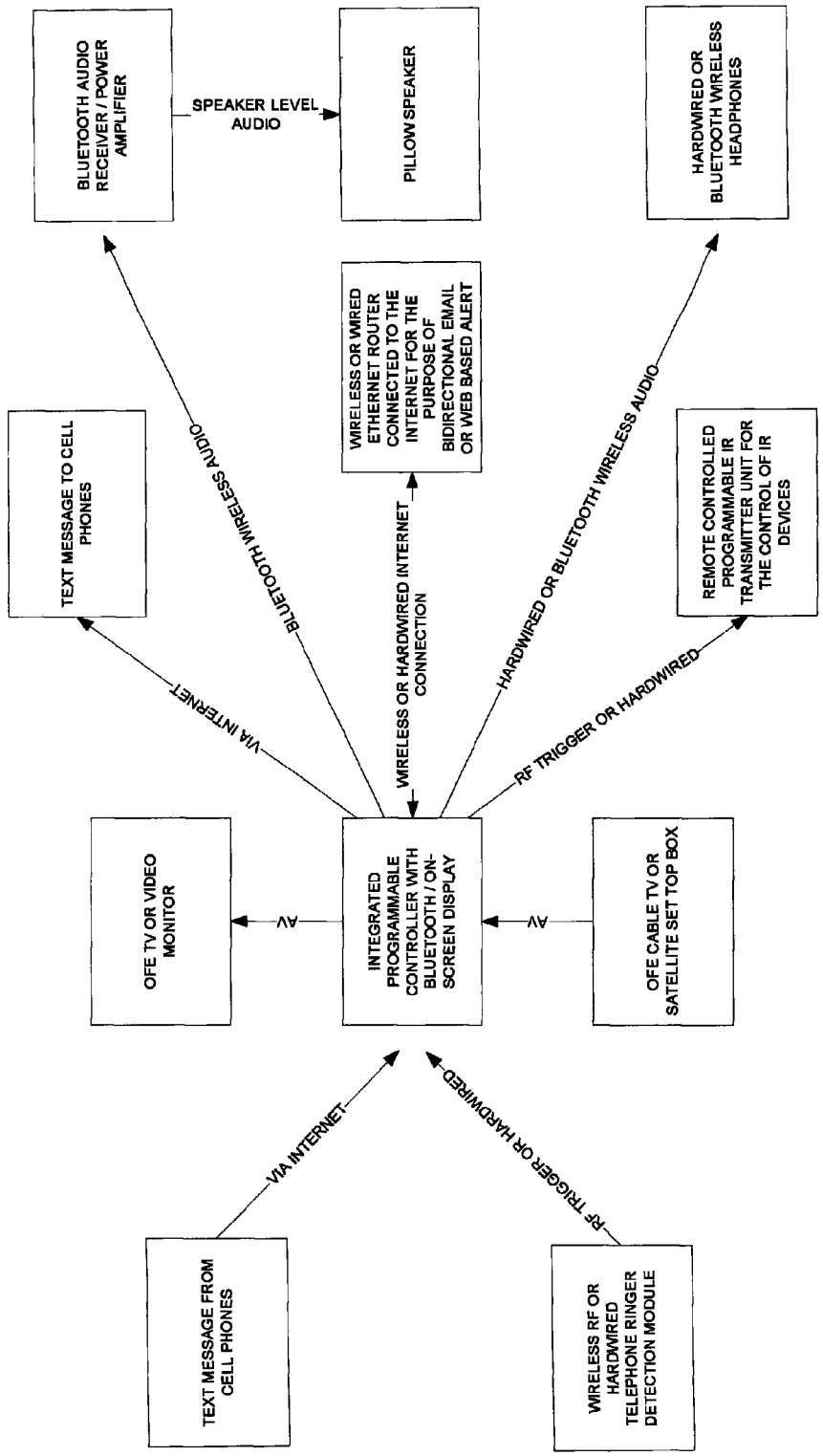
FIG. 6 is a block diagram showing a Communications Embodiment.

Referring to FIG. 1, the novel electronic aid for hearing and/or visually impaired persons is indicated as the "DB Systems Integrated Programmable Controller with Bluetooth/On-screen Display". This device accepts all of the actuation inputs and sends all related output signals to the various devices tied to the system. The unit passes, and during an alert condition, processes the audio/video signals to substitute the program audio with an audible announcement and to overlay text on the video screen displaying the announcement in text. The integrated Bluetooth transmitter provides an audio signal to either headphones or a Bluetooth enabled power amplifier connected to a remote speaker or even a pillow speaker. The unit's integrated Ethernet connection allows for bi-directional email or bi-directional web based alerts. An integrated infrared (IR) port allows for control of IR controllable devices. Since the unit is programmable, IR codes from various manufacturers' remotes can be learned into the system.

To the left-hand side are three external input devices which function as the alert actuators:

The "Doorbell Pushbutton" can be connected through hardwire or by wireless mechanism. When someone rings the doorbell, a pre-defined alert for a pre-determined time period will be announced and displayed accordingly. Through the "web based" setup utility, other alerts such as email or flashing lights in remote location can be configured as well.

The "Telephone Ringer Detection Module" can be connected through hardwire or by wireless mechanism. The unit detects the signal of an incoming call as well as if the phone is in use. During either of those conditions, a pre-defined alert for a pre-determined time period will be announced and displayed accordingly. Through the "web based" setup utility, other alerts such as email, vibrator pad or flashing lights in remote location can be configured as well.

The "Alarm Input Module" can be connected through hardwire or by wireless mechanism. The unit detects a contact closure. This external input device can be used for many purposes. For example; a door-open sensor, pressure mat, burglar alarm system or a building fire alarm system. During an alarm condition, a pre-defined alert for a pre-determined time period will be announced and displayed accordingly. Through the "web based" setup utility, other alerts such as email or flashing lights in remote location can be configured as well.

A significant difference in the present invention over prior art is the use of Ethernet based programmable controllers, audio messaging processors and video text overlay generators. By integrating these technologies, we now have the ability to provide audible announcements and video text messages as well as an email of the alert. Programmable time periods and repeats of the alerts can be set.

Doorbell-Telephone Announcement Embodiment (FIG. 2)-*configured* for, but not restricted to persons with hearing or visual impairments or those who watch television with the audio loud enough for either the doorbell or telephone not to be heard. This configuration will interrupt television audio programming to announce that either the doorbell is sounding or that the telephone is ringing. Further to this, the video programming will be overlaid with text stating the cause of the interruption and, in the case of an incoming telephone call, and where available, Caller-ID will be posted on the television screen.

Home Timer Announcement Embodiment (FIG. 3)—configured for, but not restricted to persons with hearing or visual impairments or those who wish to be alerted when a specific event's time has come. The timer is set for a specific event such as picking up the children at school, taking the wash out of the dryer or anything that requires a reminder at a specific time and when that time transpires, this embodiment will interrupt television audio programming to announce the event and video programming will be overlaid with text announcing the event. The configuration is not limited to television but can also send announcements to the computer via internet or LAN or send a text message to cell phones or make said announcement via any current or future available technology that the event's time has come.

Home Security Embodiment (FIG. 4)—configured to work in conjunction with an already existing home security system, this embodiment is designed for, but not restricted to persons with hearing or visual impairments or those who wish to be alerted when their existing security systems has been triggered for an event such as but not limited to break-in, smoke or fire. This embodiment will interrupt television audio programming to announce the event and video programming will be overlaid with text announcing the event. The configuration is not limited to television but can also send announcements to the computer via internet or LAN or send a text message to cell phones or make said announcement via any current or future available technology that the alarm system has been triggered.

Personal Emergency Alert Embodiment (FIG. 5)—configured for, but not restricted to the person concerned about having an emergency experience such as a fall, cardiac event or such and not being able to get to a telephone or call for help. In the case of such a person experiencing a 'personal emergency', a single tactile button on the remote control device of the alert device and/or the Bluetooth enabled pillow labeled and shaped as and with an emergency logo can be pressed and held for three seconds. By doing so, the system will engage in an 'emergency mode' wherein all audio will be muted, a call will be placed to 911 and an emergency signal sent to a monitoring company which can be and not limited to a Cable TV Operator or Security Company. The Bluetooth pillow will act as a bi-directional speaker phone and allow the person experiencing the emergency to have a conversation with the emergency attendant at the Monitoring Company. The Monitoring Company can then assist the party having the 'personal emergency' by dispatching ambulance, police, fire, etc. Simultaneously, the system can operate other devices such as a bell, light, email alert or text messages to a cell phone. The system provides the mechanism to send alerts not limited to family members or care givers when the system is engaged in 'emergency mode'.

Communications Embodiment (FIG. 6)—configured for, but not restricted to persons with hearing or visual impairments or the person wishing to have all communications electronically received, via text message, email or telephone, transmitted to the local television. Once so transmitted, the system will allow for two way conversation via Bluetooth Bi-directional Pillow. The concept is not limited to the input and output technologies currently in existence, but adapts to new communication technologies.

While particular embodiments of the present invention have been shown and described, it will be obvious to those skilled in the art that changes and modification may be made without departing from this invention in its broader aspects and, therefore, the aim in the appended claims is to cover all such changes and modifications as fall within the true spirit and scope of this invention.

What is claimed is:

1. An alert system for hearing and/or visually impaired persons that provides audio muting, audible alert annunciation and video text overlay on and of external and remote competing sound sources, the system comprising:
   (a) a telephone ring and off-hook detector device wherein an alerting signal is sent by an actuator to an input of an integrated programmable controller by either hardwired or wireless transmission;
   (b) a receiver for receiving an actuator alerting signal from an external doorbell device, wherein said alerting signal is sent to an input of an integrated programmable controller by either hardwired or wireless transmission;
   (c) an external auxiliary device receiving an actuator alerting signal that is sent to an input of an integrated programmable controller by either hardwired or wireless transmission;
   (d) a series of programmable variable time delay mechanism independently associated with all input and output signals of said system;
   (e) an output switching mechanism connected to said integrated programmable controller;
   (f) an audio output switching mechanism connected to said integrated programmable controller;
   (f) a video output switching mechanism connected to said integrated programmable controller;
   (g) an Ethernet output switching mechanism connected to said integrated programmable controller;
   (h) an infrared output switching mechanism connected to said integrated programmable controller;
   (i) a closed loop power latching mechanism connected to said integrated programmable controller and to said output switching mechanism;
   (j) an integrated programmable controller termination mechanism connected to said integrated programmable controller and said output switching mechanism, wherein said output switching mechanism selectively provides outputs of: text overlay on top of an existing video display device signal; replacement of an audio signal with audible annunciation describing an alert condition; visual alert devices; audio alert devices; mechanical alert devices; and combinations thereof; and
   (k) an external actuator identification mechanism connected to said integrated programmable controller with a series of programmable variable time delay mechanism and to said output and isolation mechanism.

2. The alert system according to claim 1, wherein:
   the AC voltage detection and calibration mechanism provides detection of an AC ringing voltage from a composite AC and direct current of an external telephone actuator alerting signal and calibration of said AC ringing voltage to a level compatible with said alert system;
   the magnetic isolation and impedance matching mechanism provides isolated and non-wired coupling between said external telephone actuator alerting signal and subsequent active processing circuits and matches a 600 ohm impedance of said external telephone actuator alerting signal and a characteristic impedance of said alert system; and
   a first voltage conversion mechanism providing a unidirectional signal.

3. The alert system according to claim 1, wherein the second voltage conversion mechanism provides a unidirectional signal from an AC or DC external doorbell actuator alerting signal.

4. The alert system according to claim 1, wherein each of said first and second paralleling and storage mechanism provides storage of excess inputs from said first multiple input coupling and isolation mechanism if a plurality of inputs exists from more than one of said external actuator alerting signals.

5. The alert system according to claim 1, wherein each of said series of programmable variable time delay mechanism is designed for maximum time delay requirement with a variation control to reduce a time interval as desired.

6. The alert system according to claim 1, wherein the integrated programmable controller mechanism comprises a programmable controller which is connected to said external actuation devices and a standard DC power source.

7. The alert system according to claim 6, wherein said output switching mechanism provides control of said external competing sound sources, audio alerts, visual alerts, on-screen display alerts, web based alerts, and the DC power source.

8. The alert system according to claim 6, wherein the external identification mechanism comprises independent inputs being connected to said power source, each of said series of programmable variable time delay mechanism, and having but not limited to on-screen display, audible annunciation, email alerts, signal lights all corresponding to an active external actuator alerting signal input mechanism.

* * * * *